United States Patent
Elshafie et al.

(10) Patent No.: US 12,507,171 B2
(45) Date of Patent: Dec. 23, 2025

(54) LOW-POWER RADIO REFERENCE SIGNAL SIGNALING

(71) Applicant: QUALCOMM Incorporated, San Diego, CA (US)

(72) Inventors: Ahmed Elshafie, San Diego, CA (US); Huilin Xu, Temecula, CA (US); Marwen Zorgui, San Diego, CA (US); Yuchul Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 18/172,547

(22) Filed: Feb. 22, 2023

(65) Prior Publication Data

US 2024/0284328 A1  Aug. 22, 2024

(51) Int. Cl.
*H04W 52/02* (2009.01)

(52) U.S. Cl.
CPC .............................. *H04W 52/0225* (2013.01)

(58) Field of Classification Search
CPC ......................... H04W 52/0225; H04W 52/028
See application file for complete search history.

(56) References Cited

U.S. PATENT DOCUMENTS

2021/0185611 A1\* 6/2021 Ljung ................ H04W 52/0216

OTHER PUBLICATIONS

Zhu ("Physical Layer Signals and Procedures for Low-Power WUS", 3GPP TSG RAN WG1 #112 R1-2300666, Feb. 17, 2023) (Year: 2023).\*
International Search Report and Written Opinion—PCT/US2024/013710—ISA/EPO—Jun. 11, 2024.
Zhu M (CATT)., et al., "Physical Layer Signals and Procedures for Low-Power WUS", 3GPP TSG RAN WG1 #112, R1-2300666, 3rd Generation Partnership Project, Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 9 Pages, XP052247812, The Whole Document.

\* cited by examiner

*Primary Examiner* — Jamal Javaid
(74) *Attorney, Agent, or Firm* — SUNSTEIN LLP

(57) ABSTRACT

A low-power reference signal method includes: transmitting, from a UE to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals; receiving, at the UE from the network entity, a reference signal configuration of the first reference signals; and processing, at the UE using the low-power radio, the first reference signals in accordance with the reference signal configuration.

25 Claims, 10 Drawing Sheets

LOW-POWER RADIO REFERENCE SIGNAL SIGNALING

FIELD OF THE DISCLOSURE

The field of the disclosure is low-power reference signal signaling, e.g., transmission and/or reception.

BACKGROUND

Wireless communication systems have developed through various generations, including a first-generation analog wireless phone service (1G), a second-generation (2G) digital wireless phone service (including interim 2.5G and 2.7 5G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example user equipment (UE) includes: a memory; a transceiver comprising a main radio and a low-power radio, wherein the low-power radio is configured to process first reference signals using less power than the main radio is configured to use to process second reference signals, the first reference signals being low-power reference signals; and a processor, communicatively coupled to the memory and the transceiver, configured to: transmit, via the transceiver to a network entity, a capability message indicating a capability of the UE to process the first reference signals using the low-power radio; receive, via the transceiver from the network entity, a reference signal configuration of the first reference signals; and process, using the low-power radio, the first reference signals in accordance with the reference signal configuration.

An example low-power reference signal method includes: transmitting, from a user equipment (UE) to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals; receiving, at the UE from the network entity, a reference signal configuration of the first reference signals; and processing, at the UE using the low-power radio, the first reference signals in accordance with the reference signal configuration.

Another example UE includes: means for transmitting, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals; means for receiving, from the network entity, a reference signal configuration of the first reference signals; and means for processing, using the low-power radio, the first reference signals in accordance with the reference signal configuration.

An example non-transitory, processor-readable storage medium includes processor-readable instructions to cause a processor of a user equipment (UE) to: transmit, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals; receive, from the network entity, a reference signal configuration of the first reference signals; and process, using the low-power radio, the first reference signals in accordance with the reference signal configuration.

An example network entity includes: a memory; a transceiver; and a processor, communicatively coupled to the memory and the transceiver, configured to: receive, via the transceiver from a user equipment (UE), a capability message indicating a capability of the UE to process low-power reference signals using a low-power radio of the UE; and transmit, via the transceiver to the UE, one or more configuration parameters of a low-power reference signal based on the capability message.

An example low-power reference signal method includes: receiving, at a network entity from a user equipment (UE), a capability message indicating a capability of the UE to process low-power reference signals using a low-power radio of the UE; and transmitting, from the network entity to the UE, one or more configuration parameters of a low-power reference signal based on the capability message.

Another example network entity includes: means for receiving, from a user equipment (UE), a capability message indicating a capability of the UE to process low-power reference signals using a low-power radio of the UE; and means for transmitting, to the UE, one or more configuration parameters of a low-power reference signal based on the capability message.

Another example non-transitory, processor-readable storage medium includes processor-readable instructions to cause a processor of a network entity to: receive, from a user equipment (UE), a capability message indicating a capability of the UE to process low-power reference signals using a low-power radio of the UE; and transmit, to the UE, one or more configuration parameters of a low-power reference signal based on the capability message.

DETAILED DESCRIPTION

Figure 1:
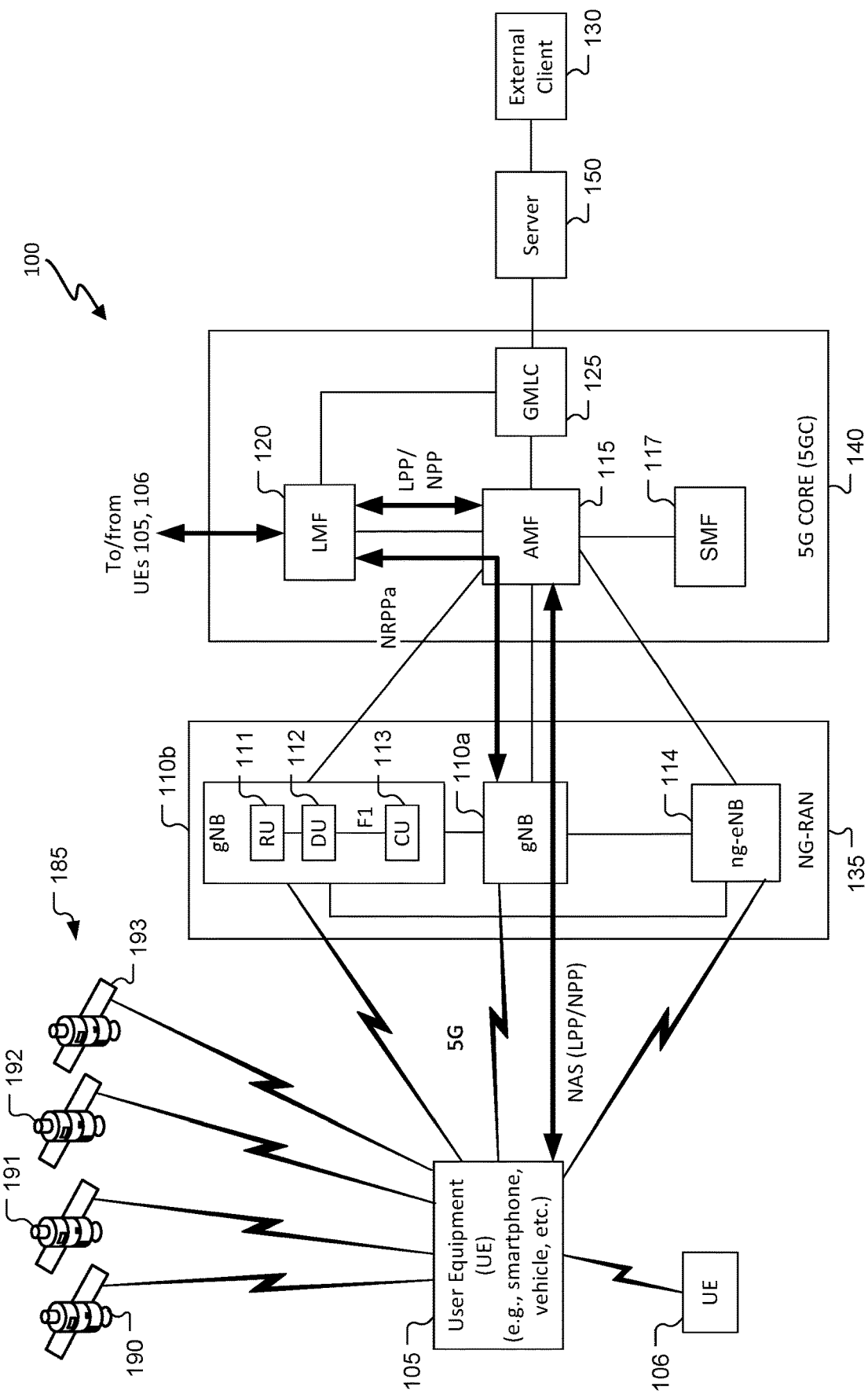
FIG. 1 is a simplified diagram of an example wireless communications system.

Techniques are discussed herein for using a low-power radio of a user equipment (UE) for positioning and/or sensing. For example, a low-power radio reference signal may be configured differently than existing reference signals for positioning and/or sensing. A low-power radio reference signal, or low-power reference signal (LP-RS), may have one or more configuration parameters that differ from a configuration of a standard reference signal. For example, compared to a traditional RS for use by a main radio of a UE, an LP-RS may have a different modulation, waveform, sequence, transmit power (could have delta power factors configured relative to other PRS resources), QCL (Quasi-Co-Location) source, repetition factor, and/or time/frequency configuration(s), required accuracy from positioning/sensing point of view, SCS (Subcarrier Spacing), BW (bandwidth), guard band around the signals, and/or RF (Radio Frequency) requirements and/or impairments for generated and/or received signals. The UE may send a capability message to a network entity to indicate that the UE is capable of processing LP-RS, e.g., for reception and/or transmission. The UE may indicate, as part of the capability message and/or in a separate message, an on-demand request for an LP-RS configuration that the UE can use for positioning and/or sensing signaling (i.e., signal transfer of signal reception, signal transmission, or both). The network entity can send an LP-RS configuration to the UE, e.g., based on, and possibly in response to, the capability message and/or the on-demand LP-RS configuration request from the UE. Other configurations, however, may be used.

Items and/or techniques described herein may provide one or more of the following capabilities, as well as other capabilities not mentioned. Positioning and/or sensing signaling may be performed using less power than traditional techniques. Use of a low-power radio by a UE may be initiated by a network entity or the UE. Use of a low-power radio by a UE may be initiated on-demand by the UE. A low-power reference signal may be configured to facilitate processing with less power than for traditional reference signals, e.g., being time-domain based such that conversion to and/or from frequency domain may be avoided. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more deviceto-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g., the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
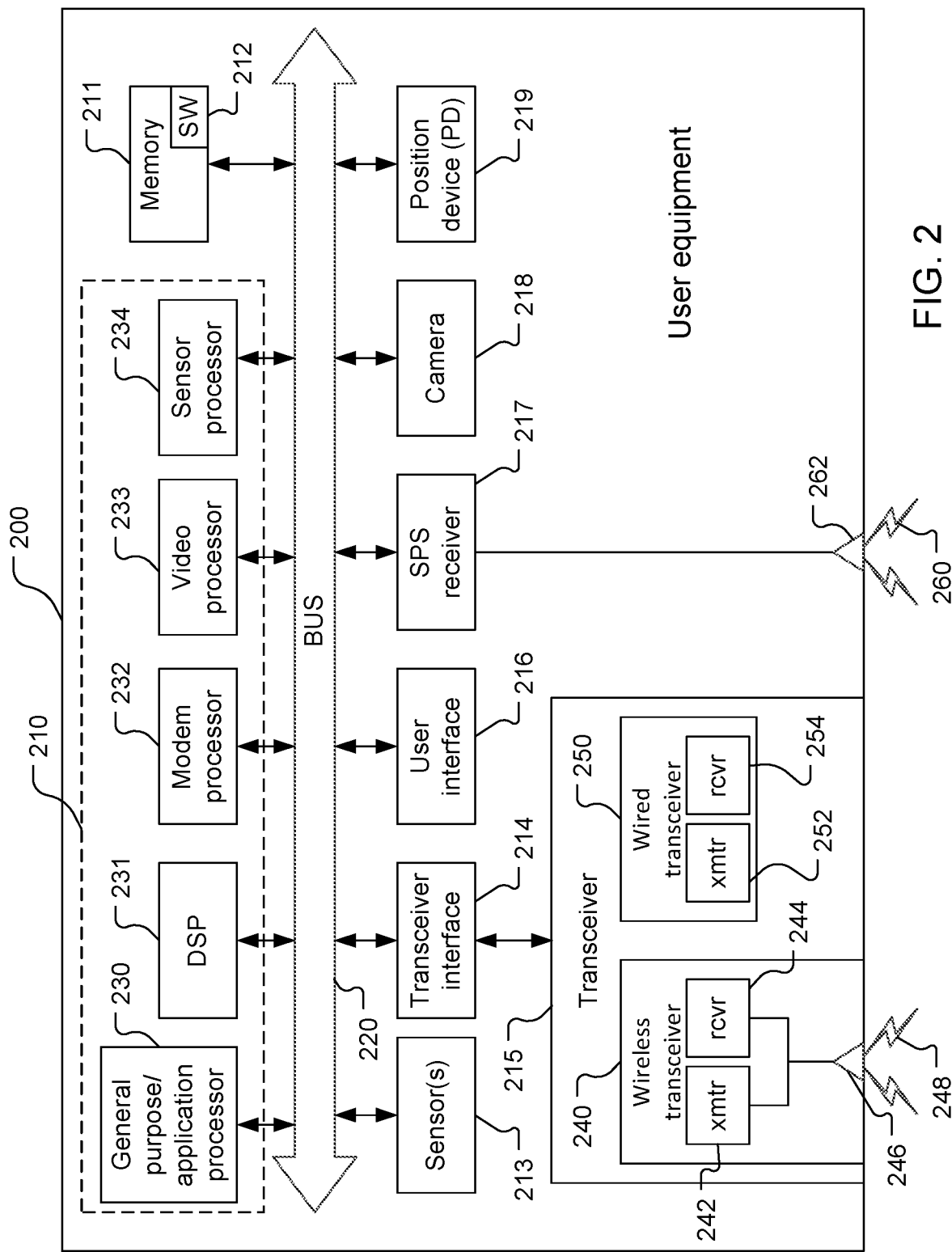
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
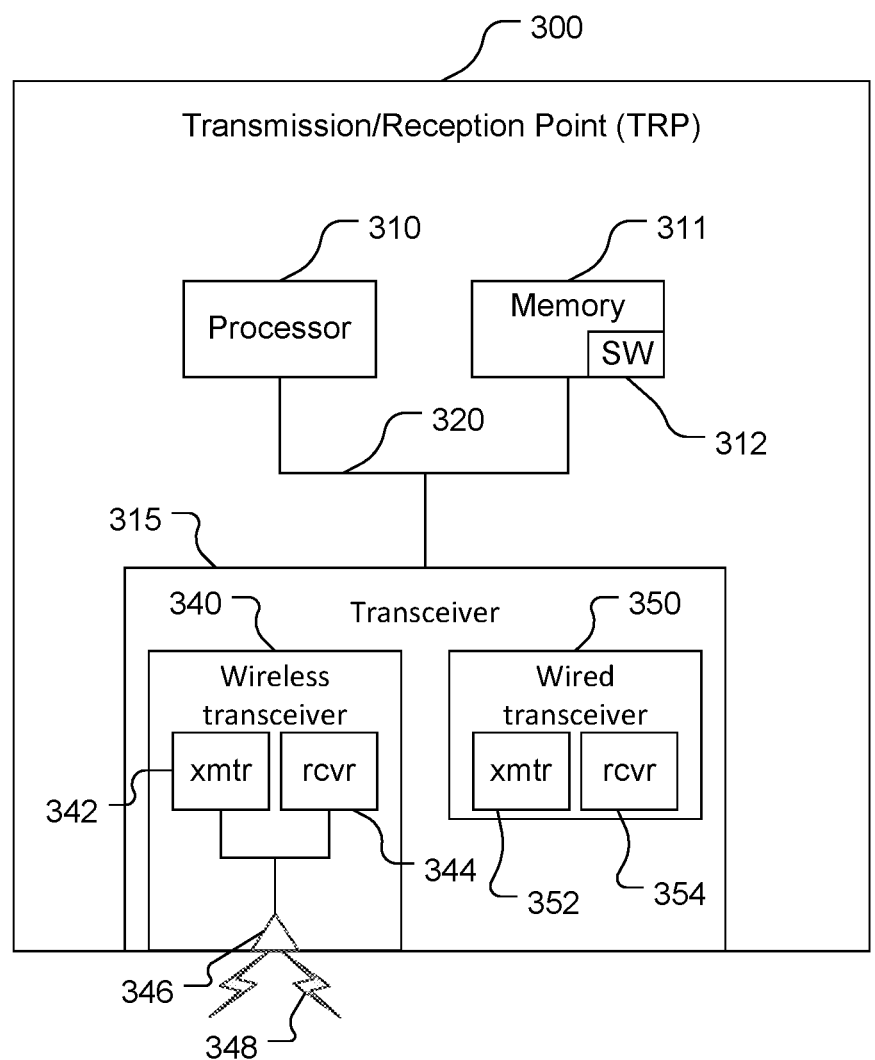
FIG. 3 is a block diagram of components of an example transmission/reception point shown in FIG. 1.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
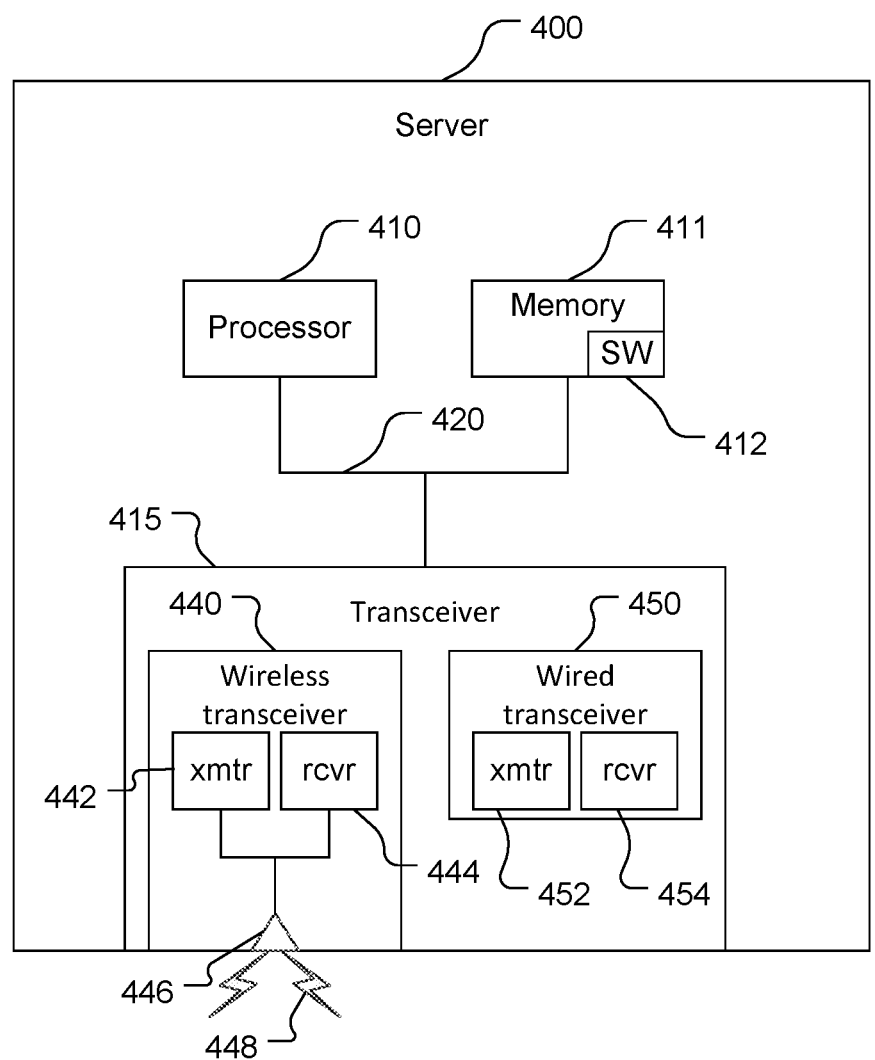
FIG. 4 is a block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, and subtracting the $UE_{Rx-Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID)

transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
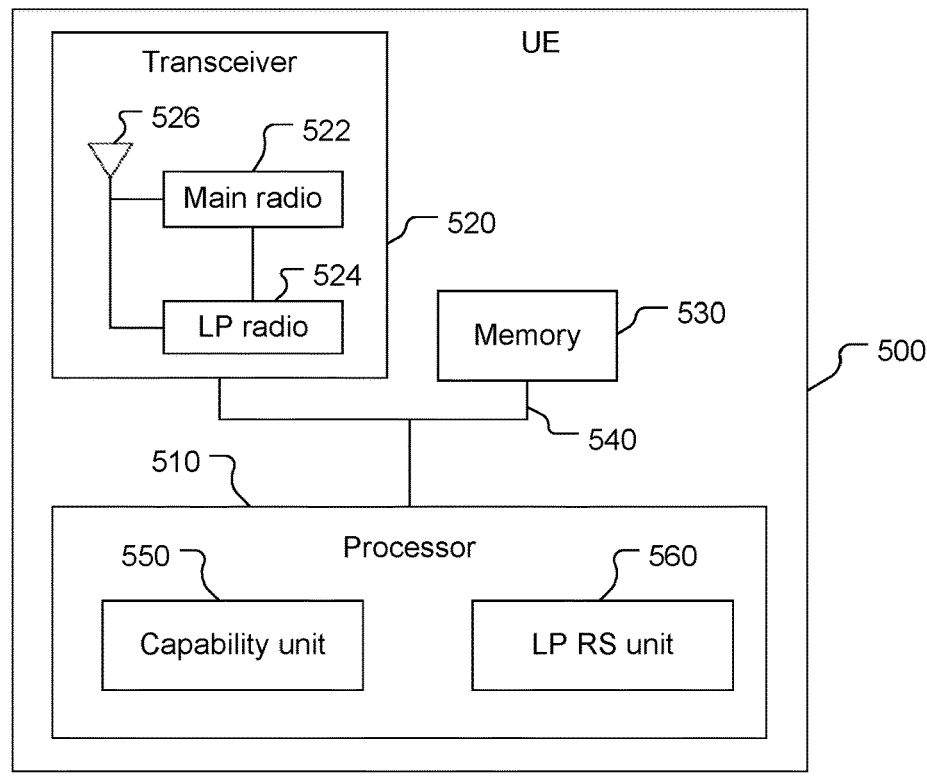
FIG. 5 is a block diagram of an example user equipment.

Referring also to FIG. 5, a UE 500 may include a processor 510, a transceiver 520, and a memory 530 communicatively coupled to each other by a bus 540. The UE 500 may include the components shown in FIG. 5. The UE 500 may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a capability unit 550 and an LP RS unit 560 (low power reference signal unit). The capability unit 550 and the LP RS unit 560 are discussed further below, and the description may refer to the processor 510 generally, or the UE 500 generally, as performing any of the functions of the capability unit 550 and/or the LP RS unit 560, with the UE 500 being configured to perform the function(s).

Figure 6:
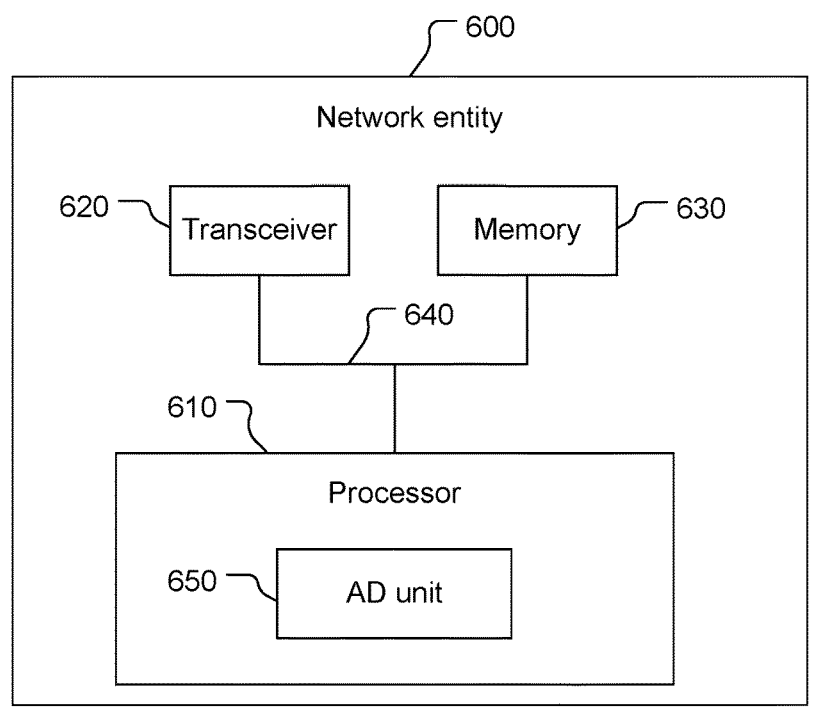
FIG. 6 is a block diagram of an example network entity.

Referring also to FIG. 6, a network entity 600 may include a processor 610, a transceiver 620, and a memory 630 communicatively coupled to each other by a bus 640. The network entity 600 may include the components shown in FIG. 6. The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include an AD unit 650 (Assistance Data unit). The AD unit 650 is discussed further below, and the description may refer to the processor 610 generally, or the network entity 600 generally, as performing any of the functions of the AD unit 650, with the network entity 600 being configured to perform the function(s).

Referring again to FIG. 5, the transceiver 520 may include a main radio, a low-power radio 524 (LP radio), and one or more antennas 526. The LP radio 524 may be referred to as a low-power wake-up radio (LP-WUR). The LP radio 524 may be a companion receiver, to the main radio 522, and may be configured to monitor wake-up signals with very low power, e.g., while the main radio 522 is in a deep sleep state. The LP radio 524 may be configured to wake up the main radio 522 when actual data communication is to be performed. The LP radio 524 may be configured to consume low amounts of power by design, e.g., being powered separately from the main radio 522, and including fewer components and/or lower-power-consumption components than the main radio 522. For example, the LP radio 524 may use one or more components that are less accurate than similar component(s) of the main radio 522 and/or that perform less complex processing than similar component(s) of the main radio 522. The LP radio 524 may share one or more components with the main radio 522, e.g., may share an antenna with the main radio 522. Use of the LP radio 524 may avoid wake-ups by the main radio 522 that would occur absent the LP radio 524, thus reducing power consumption of the UE 500. The LP radio 524 may monitor for wake-up signals (WUS) more often than the main radio 522 would, e.g., due to using less power to do so, and thus an average latency of the UE 500 may be reduced.

Various example implementations of the LP radio 524 may be used. For example, referring also to FIGS. 7-9, RF envelope detection, heterodyne, or zero-IF example implementations may be used.

Figure 7:
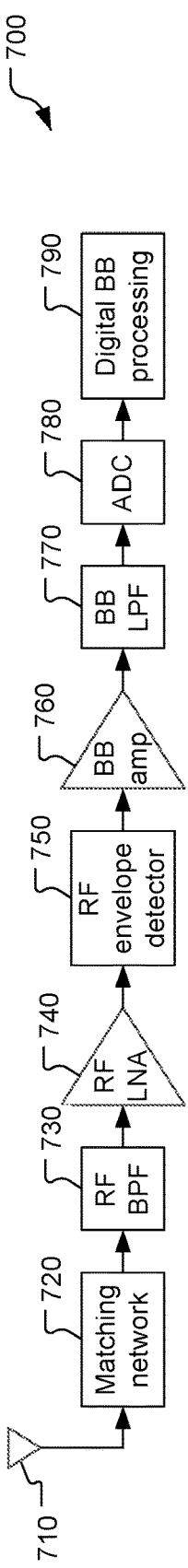
FIG. 7 is a block diagram of an example low-power radio.

As shown in FIG. 7, an RF envelope detection LP radio 700 may include an antenna 710, a matching network 720, an RF BPF 730 (RF band-pass filter), an RF LNA 740 (RF low-noise amplifier), an RF envelope detector 750, a BB amplifier 760 (baseband amplifier), a BB LPF 770 (BB low-pass filter), an ADC 780 (analog-to-digital converter), and a digital BB processing unit 790. Using the LP radio 700, an RF signal may be converted into a baseband signal directly via the RF envelope detector 750. The LP radio 700 includes no LO (local oscillator) and no PLL (phase-locked loop), which helps the LP radio 700 consume a low amount of power. Various implementations of the ADC 780 may be used, e.g., a 1-bit ADC or a multi-bit ADC. One or more of the components of the LP radio 700 may be omitted to further reduce power consumption. For example, the RF LNA 740 and/or the BB amplifier 760 may be omitted. The matching network 720 (e.g., a high-Q matching network) and/or the RF BPF 730 (and/or the BB LPF 770) may be used to suppress adjacent channel interference and/or interference from legacy NR signals and/or other low-power wake-up signals on adjacent subcarriers.

Figure 8:
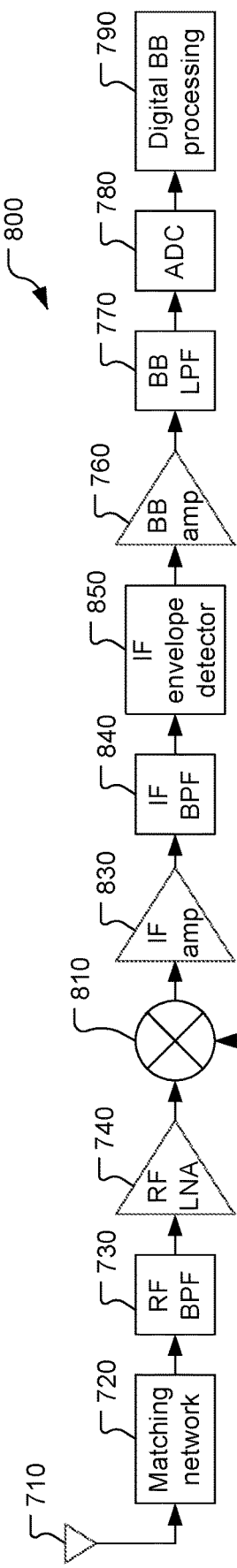
FIG. 8 is a block diagram of another example low-power radio.

As shown in FIG. 8, a heterodyne LP radio 800 may include the antenna 710, the matching network 720, the RF BPF 730, the RF LNA 740, an RF mixer 810, an LO 820, an IF amplifier 830 (Intermediate Frequency amplifier), an IF BPF 840, an IF envelope detector 850, the BB amplifier 760, the BB LPF 770, the ADC 780, and the digital BB processing unit 790. Using the LP radio 800, an RF signal may be down converted into an IF signal via the RF mixer 810 and the LO 820. The IF signal may be converted into a baseband signal by the IF envelope detector 850, and there may be one or more IF stages depending on the design. The configuration of the LO 820 may have significant impact on the power consumption of the LP radio 800. For example, power consumption may be reduced by relaxing the accuracy and stability requirements of the LO 820. As another example, a frequency-locked loop (FLL) may be used instead of a PLL for non-coherent detection. An image rejection filter or an image rejection mixer may be used. As with the LP radio 700, one or more components of the LP radio 800 may be omitted such as the RF LNA 740, the IF amplifier 830, and/or the BB amplifier 760.

Figure 9:
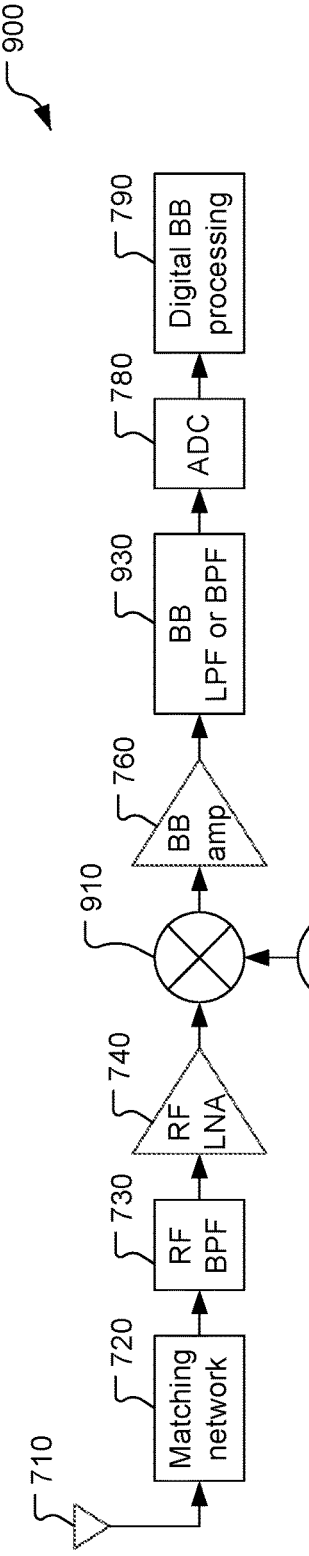
FIG. 9 is a block diagram of another example low-power radio.

As shown in FIG. 9, a zero-IF LP radio 900 may include the antenna 710, the matching network 720, the RF BPF 730, the RF LNA 740, an RF mixer 910, an LO 920, the BB amplifier 760, a BB LPF or BPF 930, the ADC 780, and the digital BB processing unit 790. Using the LP radio 900, an RF signal may be down converted directly into a BB signal via the RF mixer 910 and the LO 920. Baseband envelope detection (not shown in FIG. 9) may be performed in the analog domain or in the digital domain. Using the LP radio 900, an image rejection filter may be omitted. As with the LP radio 700 and the LP radio 800, one or more components of the LP radio 900 may be omitted such as the RF LNA 740 and/or the BB amplifier 760.

Various configurations of low-power wake-up signals (LP-WUS) may be used. For example, OFDM-based wake-up signals or ON-OFF-keying-based (OOK-based) or FSK-based (Frequency-Shift-Keying-based) or Chirp-based WUS may be used, where the waveform may be OFDM or another waveform (e.g., single carrier). An OFDM-based WUS may have an LTE NB-IoT/eMTC-like configuration (Narrow-band (NB) Internet of Things (IoT)/enhanced machine type communication (eMTC) like configuration). In this case, the LP radio 524 may process the WUS at baseband. One or more components of the main radio 522 may be used as part of the LP radio 522 to receive the LP-WUS. The sequence design of SSS/PSS (secondary synchronization signal/primary synchronization signal), e.g., based on a Gold sequence, may be leveraged for the LP-WUS configuration. For OOK-based LP-WUS (i.e., with OOK modulation), a WiFi-11ba-like design may be used. The LP radio 524 may use an envelope detector (e.g., a low IF envelope detector). The LP radio 524 may be completely separate from the main radio 522 or may share one or more components with the main radio 522. A Manchester code may be used, e.g., to provide for a simple receiver implementation, to provide resilience to interference, and to help ensure a 50% duty cycle and avoid long periods of zeroes (0's). Use of OOK-based LP-WUS may provide significant power saving, e.g., by avoiding conversion to frequency domain (e.g., using a Fourier transform).

Figure 10:
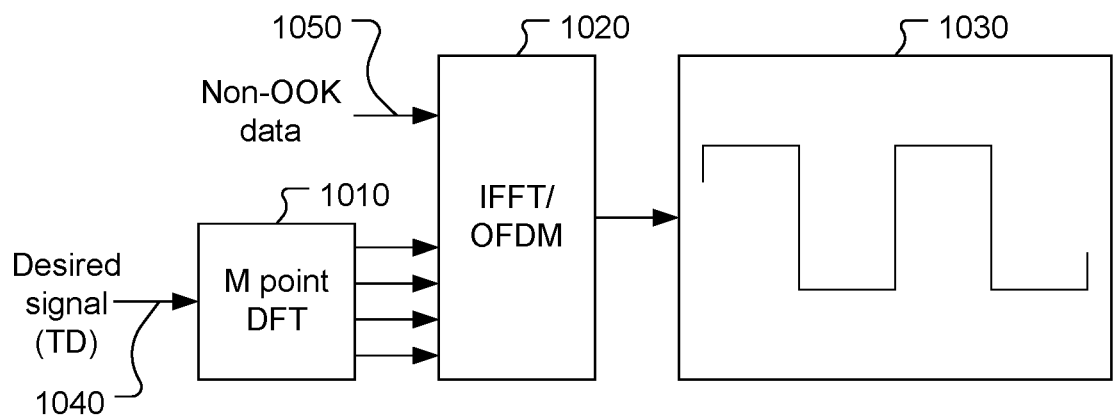
FIG. 10 is a block diagram of OFDM-compatible OOK signal generation.
Figure 11:
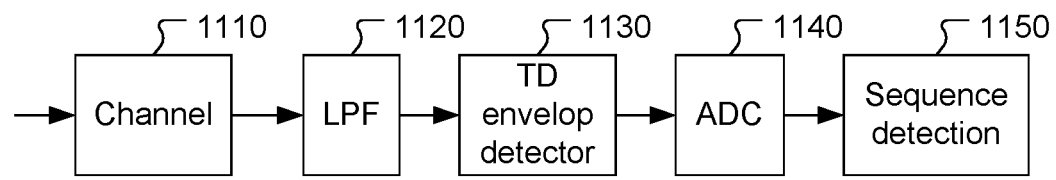
FIG. 11 is a block diagram of OFDM-compatible OOK signal reception.

Referring also to FIG. 10 and FIG. 11, an OFDM-compatible OOK signal may be produced and detected. An M-point DFT 1010 (Discrete Fourier Transform) and an IFFT/OFDM 1020 (Inverse Fast Fourier Transform/OFDM) may be used to produce an OFDM-compatible OOK signal 1030. A desired signal 1040 in the time domain (TD), e.g., an up-sampled OOK signal with Manchester coding (e.g., $[1, \ldots, 1, 0, \ldots, 0, 1, \ldots, 1, 0, \ldots, 0]$) can be input to the M-point DFT 1010. Outputs of the M-point DFT 1010 and non-OOK data 1050 may be input to the IFFT/OFDM 1020, that outputs the OFDM-compatible OOK signal 1030. The OFDM-compatible OOK signal 1030 (e.g., a WUS or other reference signal) may be transmitted over a channel 1110 and processed by an LPF 1120, a time domain envelop detector 1130, an ADC 1140, and a sequence detector 1150 in order to detect the OFDM-compatible OOK signal 1030.

The UE 500 may receive reference signals with either the main radio 522 or the LP radio 524 and may transmit reference signals with either the main radio 522 or the LP radio 524. The reference signals may be used for positioning, i.e., to determine position information such as a position estimate for the UE 500. Low-power reference signals (LP-RS) may be configured for processing by the LP radio 524, e.g., being less complex than traditional positioning RS to facilitate processing by the LP radio 524. The UE 500 may reduce power consumption by using the LP radio 524 during RRC connected mode (e.g., deep sleep) and/or during idle mode.

Figure 12:
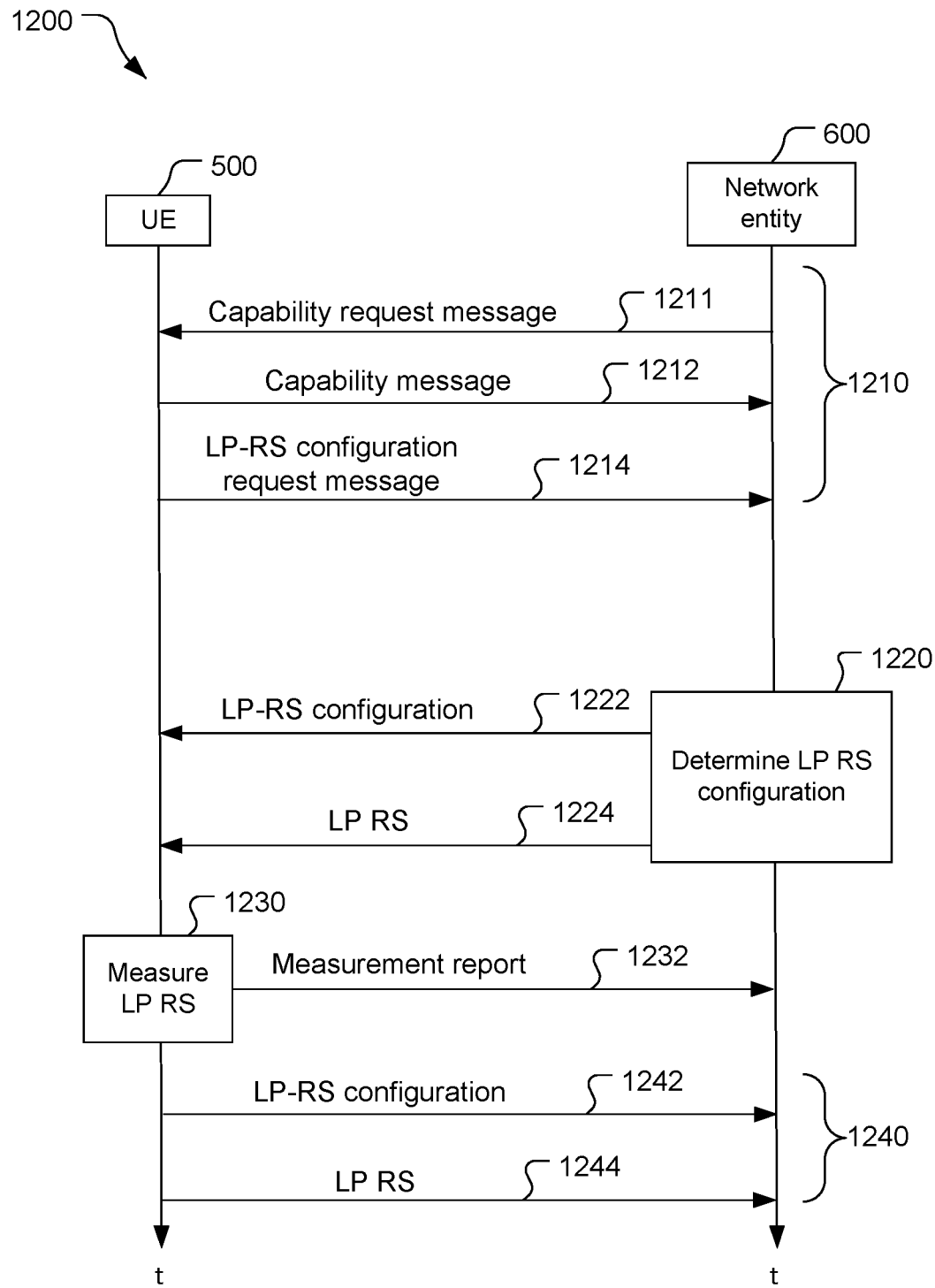
FIG. 12 is a signal and processing flow diagram for low-power reference signal transfer.

Referring also to FIG. 12, a signal and processing flow 1200 may be used for signal transfer between the UE 500 and the network entity 600 for positioning (e.g., of the UE 500) and/or sensing. The signal and processing flow 1200 includes messages and stages shown, and is an example flow and not limiting. The flow 1200 may be altered, e.g., by having one or more messages and/or one or more stages added, removed, rearranged, combined, performed concurrently, and/or having one or more messages and/or one or more stages split into multiple messages and/or stages. For example, transmission of a capability request message 1211 and/or transmission of a reference signal configuration request (e.g., an LP-RS configuration request message 1214) may be omitted. As another example, stage 1230 or stage 1240 may be omitted. The network entity 600 may comprise multiple entities. The network entity 600 may be an entity that configures reference signals and may be disposed in the core network. For example, the network entity 600 may be a gNB, or an LMF, or a sensing entity. For communication from the UE 500 to the network entity 600 (e.g., an LMF and/or a sensing entity), one or more upper layers may be used, similar to existing communication to network entities (e.g., an LMF and/or a sensing entity).

At stage 1210, the UE 500, e.g., the capability unit 550, may transmit a capability message 1212 (also called a capability report) to the network entity 600. The capability message 1212 may indicate to the network entity 600 the capability(ies) of the UE 500 to process positioning/sensing reference signals using the LP radio 524, e.g., during different RRC states/modes. The positioning/sensing LP-RS may have a configuration that is different from traditional positioning/sensing RS. For example, compared to a traditional positioning/sensing RS, the positioning/sensing LP-RS may have a different modulation, waveform, sequence, transmit power (could have delta power factors configured relative to other PRS resources), QCL source, repetition factor, and/or time/frequency configuration(s), required accuracy from positioning/sensing point of view, SCS, BW, guard band around the signals, and/or RF requirements and/or impairments for generated and/or received signals. The capability message 1212 may indicate one or more configuration parameters (e.g., modulation type, waveform, and/or sequence, etc.) and the ability of the UE 500 to process signals with the indicated configuration parameter(s) using a low-power radio. The LP-RS may be similar to traditional RS (e.g., DL PRS or SRS for positioning) or may be less complex than traditional positioning/sensing RS. For example, the LP-RS may be time-domain based, such as OOK-based, which may be easier for the LP radio 524 to process (e.g., without requiring signal conversion to the frequency domain) due to lower complexity than traditional positioning/sensing RS. The UE 500, e.g., the LP RS unit 560, may transmit the LP-RS configuration request message 1214 via the transceiver 520 (e.g., the main radio 522 and/or the LP radio 524) to the network entity 600, e.g., as an on-demand request for LP-RS configuration information for an LP-RS for an on-demand positioning/sensing session. The LP-RS configuration request message 1214 may indicate one or more requested (e.g., desired and/or preferred) configuration parameters of the LP-RS.

The capability message 1212 may indicate whether the UE 500 supports reception of positioning/sensing LP RS and/or transmission of positioning/sensing LP RS. For example, the capability message 1212 may indicate one or more configuration parameters for positioning/sensing LP RS for reception and one or more configuration parameters for positioning/sensing LP RS transmission. The configuration parameter(s) for positioning/sensing LP RS for reception may be different from the configuration parameter(s) for positioning/sensing LP RS for transmission (e.g., the same parameter type may have different values for reception and transmission, and/or a particular parameter type may be specified for reception and not for transmission or vice versa, etc.). As another example, the capability message 1212 may indicate whether the UE 500 supports DL LP RS and/or UL LP RS. As another example, the LP-RS configuration request message 1214 may request DL LP RS and/or UL LP RS.

The UE 500 may be configured to transmit the capability message 1212 in one or more of a variety of ways. For example, the UE 500 may be configured to transmit the capability message 1212 in a RACH (Random Access Channel) message (e.g., msgA in two-step RACH or msg1/3 in four-step RACH) using the main radio 522. As another example, the UE 500 may be configured to transmit the capability message 1212 in a response to the capability request message 1211 sent from the network entity 600 to the UE 500 requesting the UE 500 to provide capabilities of the UE 500, e.g., regarding LP-RS processing. As another example, the UE 500 may be configured to transmit the capability message 1212 in an L1/L2/L3 (layer 1/layer 2/layer 3) indication using the main radio 522 and/or the LP radio 524. The L1/L2/L3 indication may indicate a dynamic change based on a UE sleeping mode, a power saving mode, and/or an energy profile that includes an energy charging rate profile, a discharging rate profile, and/or an energy level profile. The charging rate profile may indicate a current charging rate during a configured interval and predicted energy charging rate across one or more future configured intervals. Discharging corresponds to power/energy consumption by the UE 500. The network entity 600 may indicate support by the network entity 600 for use of a low-power radio by the UE 500 for positioning or sensing (or other use) using an MIB (Master Information Block), a SIB1 (System Information Block 1) message, an OSIB (Other System Information Block) message, a RACH message (e.g., msgB in two-step RACH, msg2/4 in four-step RACH), or an L1/L2/L3 indication to the main radio 522 and/or the LP radio 524. For the Uu interface (with the main radio 522), an L1 signal is a DCI (Downlink Control Information) signal, an L2 signal is a MAC-CE (Media Access Control-Control Element) signal, and an L3 signal is an RRC signal. For a sidelink interface (with the main radio 522), an L1 signal is an SCI (Sidelink Control Information) signal or a dedicated PSSCH signal, an L2 signal is a PC5-MAC-CE signal, and an L3 signal is a PC5-RRC signal. For sidelink, the network entity 600 (e.g., the AD unit 650) may determine a per resource pool configuration of the LP-RS. For an interface used by the LP radio 524 for Rx or Tx (reception or transmission), L1/L2/L3 signals are physical layer signals, MAC-CE signals, and layer 3 signals.

At stage 1220, the network entity 600, e.g., the AD unit 650, may determine a configuration for LP RS for positioning/sensing for the UE 500. The network entity 600 may configure the LP RS based on the capability message 1212, e.g., based on one or more configuration parameters indicated in the capability message 1212 that the UE 500 can process using the LP radio 524. The LP RS configuration may be different from the configuration(s) of RS for the main radio 522, e.g., DL PRS. The LP RS configuration may be periodic, semi-persistent, or aperiodic. The network entity 600 may transmit an LP-RS configuration message 1222 to the UE 500 indicating the positioning/sensing LP-RS configuration(s), e.g., for DL and/or UL. The LP radio 524 may be configured by the message 1222 for an entire positioning/sensing session. Alternatively, the use of the main radio 522 or the LP radio 524 may be specified dynamically (as part of the message 1222 or separately), e.g., using a low-power wake-up signal (LP WUS) or other signal, e.g., other low-power signal such as a positioning low-power signal and/or a sensing low-power signal. The LP-RS configuration message 1222 (e.g., and LP WUS) may indicate an LP RS configuration from among a set of initially-configured options (e.g., may indicate a code corresponding to an LP-RS configuration stored in the memory 530). The processing by the LP radio 524 may be of lower accuracy than processing by the main radio 522, e.g., due to larger bandwidth processable by the main radio 522 and/or one or more higher-quality components of the main radio 522 compared to the LP radio 524. The lower accuracy of the LP radio 524 may be acceptable due to one or more factors such as lower power consumption, QoS (quality of service), priority, and/or delay (latency) associated with positioning and/or sensing that is requested and/or associated with a category of the UE 500. Priority can be layer 1 (PHY) or layer 2 (MAC) priority associated with a positioning/sensing request. Alternatively still, the choice of which of the main radio 522 or the LP radio 524 to use may be determined by the UE 500, e.g., the LP RS unit 560. If the main radio 522 is in a sleep mode and a time used to wake up the main radio 522 from the sleep mode will exceed a requested delay, or if the UE 500 cannot use the main radio 522 (e.g., due to a failure), then the UE 500 may use the LP radio 524. The network entity 600 may transmit LP RS 1224, e.g., if the UE 500 is configured to support LP RS reception and the LP-RS configuration message 1222 included an LP RS configuration.

At stage 1230, the UE 500 may measure the LP RS 1224. For example, the UE 500 may measure the LP RS 1224 for positioning and/or sensing. The UE 500 may determine position information such as one or more pseudoranges and/or a position estimate for the UE 500 or another object. The UE 500 may transmit a measurement report 1232 to the network entity 600. The measurement report 1232 may include positioning information (e.g., position information) and/or sensing information. The measurement report 1232 may indicate which of the main radio 522 or the LP radio 524 that the UE 500 used to measure the LP RS 1224, e.g., if the UE 500 determined which of the radios 522, 524 to use to measure the LP RS 1224.

At stage 1240, the UE 500 may transmit positioning/sensing UL LP RS 1244 to the network entity 600. The UE 500, e.g., the LP RS unit 560, may transmit the positioning/sensing UL LP RS 1244 in accordance with the LP-RS configuration message 1222. The UE 500 may transmit an LP-RS configuration message 1242 to the network entity 600 before transmitting the LP RS 1244 if the choice of which of the radios 522, 524 to use for signal transmission is made by the UE 500. The LP-RS configuration message 1242 may indicate which RS type (e.g., which of the radios 522, 524) is to be transmitted by the UE 500 as the LP RS 1244. The LP-RS configuration message 1242 may be transmitted using L1/L2/L3 signaling and may be transmitted by the main radio 522 and/or the LP radio 524.

Figure 13:
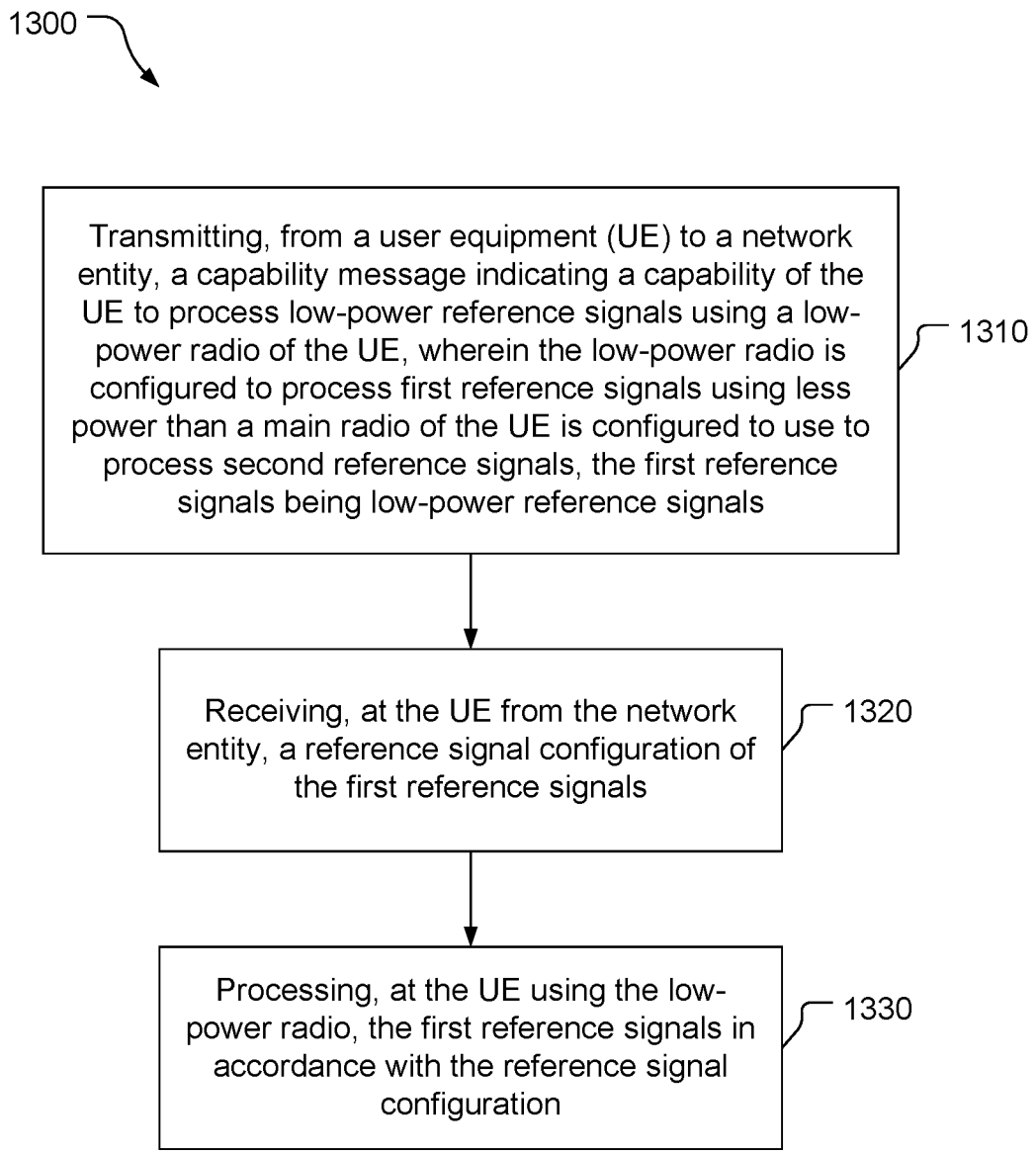
FIG. 13 is a block flow diagram of a low-power reference signal method.

Referring to FIG. 13, with further reference to FIGS. 1-12, a low-power reference signal method 1300 includes the stages shown. The method 1300 is, however, an example only and not limiting. The method 1300 may be altered, e.g., by having one or more stages added, removed, rearranged, combined, performed concurrently, and/or having one or more single stages split into multiple stages.

At stage 1310, the method 1300 includes transmitting, from a user equipment (UE) to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals. For example, the UE 500 may transmit the capability message 1212 to the network entity 600. The low-power radio, e.g., the LP radio 524, may be configured to use less power than the main radio, e.g., the main radio 522, to process signals for transmission or to process received signals. The processor 510, possibly in combination with the memory 530, in combination with the transceiver 520 (e.g., the wireless transmitter 242 (and possibly the wireless receiver 244) and the antenna 246) may comprise means for transmitting the capability message.

At stage 1320, the method 1300 includes receiving, at the UE from the network entity, a reference signal configuration of the first reference signals. For example, the UE 500 may receive the LP-RS configuration message 1222 from the network entity 600. The processor 510, possibly in combination with the memory 530, in combination with the transceiver 520 (e.g., the wireless receiver 244 and the antenna 246) may comprise means for receiving the reference signal configuration.

At stage 1330, the method 1300 includes processing, at the UE using the low-power radio, the first reference signals in accordance with the reference signal configuration. For example, the processor 520 may control the LP radio 524 to produce and send a low-power reference signal. As another example, the processor 520 may control the LP radio 524 to process a received low-power reference signal. The processor 510, possibly in combination with the memory 530, in combination with the LP radio 524, may comprise means for processing the first reference signals.

Implementations of the method 1300 may include one or more of the following features. In an example implementation, the capability message indicates one or more configuration parameters of the first reference signals that the UE is configured to process using the low-power radio. For example, the capability message 1212 may indicate one or more configuration parameters (e.g., modulation type, waveform, and/or sequence, etc.). In a further example implementation, the one or more configuration parameters includes an indication of a time-domain-based modulation scheme. In a further example implementation, the time-domain-based modulation scheme is on-off keying (OOK) modulation.

Also or alternatively, implementations of the method 1300 may include one or more of the following features. In an example implementation, the method 1300 includes determining, at the UE, whether to have the main radio or the low-power radio process the first reference signals. In a further example implementation, determining whether to have the main radio or the low-power radio process the first reference signals is based on a low-power processing signal received at the UE from the network entity. For example, the LP-RS configuration message 1222 may include an indication of which of the radios 522, 524 for the UE 500 to use to process LP RS.

Also or alternatively, implementations of the method 1300 may include one or more of the following features. In an example implementation, the method 1300 includes transmitting, from the UE to the network entity, a request for the reference signal configuration. For example, the UE 500 may transmit an on-demand request for the configuration of an LP RS. The on-demand request may be transmitted in the LP-RS configuration request message 1214 and/or as part of the capability message 1212. The processor 510, possibly in combination with the memory 530, in combination with the transceiver 520 (e.g., the wireless transmitter 242 (and possibly the wireless receiver 244) and the antenna 246) may comprise means for transmitting the request for the reference signal configuration. In a further example implementation, the request for the reference signal configuration indicates one or more configuration parameters of the first reference signals. For example, the on-demand request may indicate one or more configuration parameters (e.g., modulation type, waveform, and/or sequence, etc.).

Also or alternatively, implementations of the method 1300 may include one or more of the following features. In an example implementation, the method 1300 includes: determining at the UE whether to transmit, from the UE to the network entity, a third reference signal using the main radio or a fourth reference signal via the low-power radio; and transmitting, from the UE to the network entity before transmitting the third reference signal or the fourth reference signal, an indication of which of the third reference signal or the fourth reference signal the UE will transmit to the network entity. For example, the UE 500, e.g., the LP RS unit 560, may determine at stage 1240 to transmit the LP RS 1244 and may transmit the LP-RS configuration message 1242, before transmitting the LP RS 1244, to indicate the reference signal type to be sent by the UE 500. The indication may be explicit, specifying the RS type (e.g., LP RS), or implicit, e.g., specifying the transmit radio to be used and/or one or more configuration parameters of the reference signal to be transmitted. The processor 510, possibly in combination with the memory 530, in combination with the transceiver 520 (e.g., the wireless transmitter 242 (and possibly the wireless receiver 244) and the antenna 246) may comprise means for transmitting the indication of which signal the UE will transmit to the network entity 600. The processor 510, possibly in combination with the memory 530, may comprise means for determining whether to transmit the third reference signal or the fourth reference signal.

Figure 14:
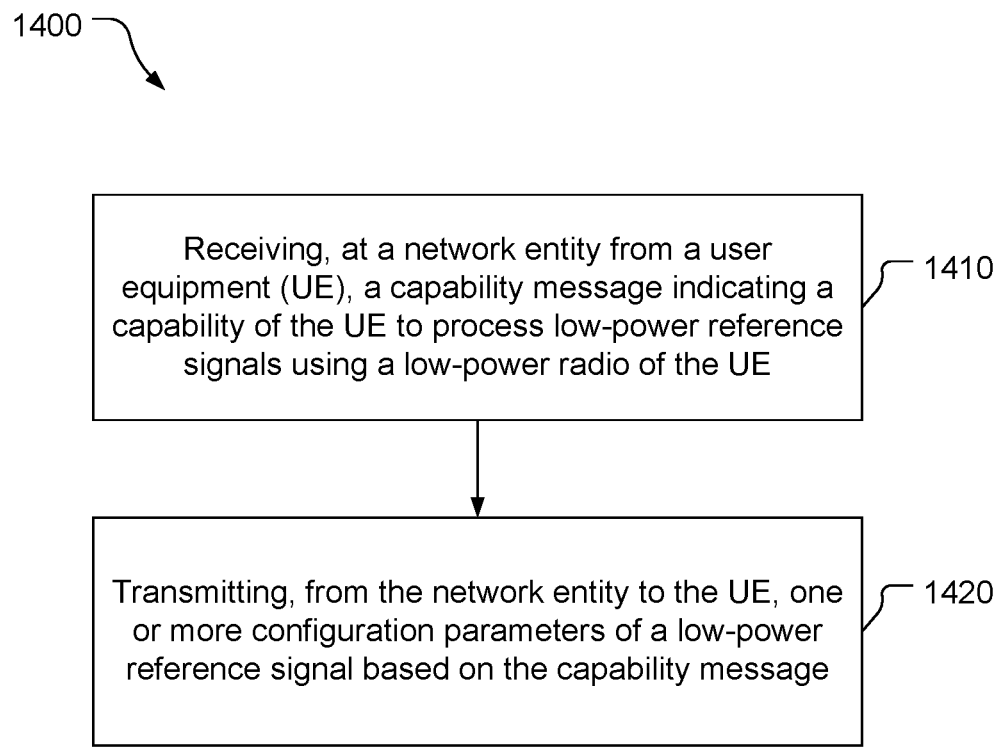
FIG. 14 is a block flow diagram of another low-power reference signal method.

Referring to FIG. 14, with further reference to FIGS. 1-12, a low-power reference signal method 1400 includes the stages shown. The method 1400 is, however, an example only and not limiting. The method 1400 may be altered, e.g., by having one or more stages added, removed, rearranged, combined, performed concurrently, and/or having one or more single stages split into multiple stages.

At stage 1410, the method 1400 includes receiving, at a network entity from a user equipment (UE), a capability message indicating a capability of the UE to process low-power reference signals using a low-power radio of the UE. For example, the network entity 600 may receive the capability message 1212 at stage 1210 from the UE 500. The processor 610, possibly in combination with the memory 630, in combination with the transceiver 620 (e.g., the wireless receiver 344 and the antenna 346, the wired receiver 354, the wireless receiver 444 and the antenna 446, or the wired receiver 454) may comprise means for receiving the capability message.

At stage 1420, the method 1400 includes transmitting, from the network entity to the UE, one or more configuration parameters of a low-power reference signal based on the capability message. For example, the network entity 600 may transmit the LP-RS configuration message 1222 to the UE 500. The processor 610, possibly in combination with the memory 630, in combination with the transceiver 620 (e.g., the wireless transmitter 342 and the antenna 346, the wired transmitter 352, the wireless transmitter 442 and the antenna 446, or the wired transmitter 452) may comprise means for transmitting the one or more configuration parameters.

Implementations of the method 1400 may include one or more of the following features. In an example implementation, transmitting the one or more configuration parameters comprises transmitting multiple configuration messages, each containing one or more respective configuration parameters corresponding to a respective low-power reference signal, during a single positioning/sensing session. For example, the use of the LP radio 524 or the main radio 522 may be dynamically specified by multiple LP-RS configuration messages 1222 in a single positioning/sensing session. In another example implementation, the one or more configuration parameters are transmitted in response to receiving, at the network entity from the UE, a request for a low-power-reference-signal configuration. For example, the network entity 600 may transmit the LP-RS configuration message 1222 in response to receiving the LP-RS configuration request message 1214 from the UE 500. The on-demand request may be part of the capability message 1212.

Implementation Examples

Implementation examples are provided in the following numbered clauses.

Clause 1. A user equipment (UE) comprising:
a memory;
a transceiver comprising a main radio and a low-power radio, wherein the low-power radio is configured to process first reference signals using less power than the main radio is configured to use to process second reference signals, the first reference signals being low-power reference signals; and
a processor, communicatively coupled to the memory and the transceiver, configured to:
transmit, via the transceiver to a network entity, a capability message indicating a capability of the UE to process the first reference signals using the low-power radio;
receive, via the transceiver from the network entity, a reference signal configuration of the first reference signals; and
process, using the low-power radio, the first reference signals in accordance with the reference signal configuration.

Clause 2. The UE of clause 1, wherein the capability message indicates one or more configuration parameters of the first reference signals that the UE is configured to process using the low-power radio.

Clause 3. The UE of clause 2, wherein the one or more configuration parameters includes an indication of a time-domain-based modulation scheme.

Clause 4. The UE of clause 3, wherein the time-domain-based modulation scheme is on-off keying (OOK) modulation.

Clause 5. The UE of clause 1, wherein the processor is configured to determine whether to have the main radio or the low-power radio process the first reference signals.

Clause 6. The UE of clause 5, wherein the processor is configured to determine, based on a low-power processing signal received via the transceiver, whether to have the main radio or the low-power radio process the first reference signals.

Clause 7. The UE of clause 1, wherein the processor is configured to transmit, via the transceiver to the network entity, a request for the reference signal configuration.

Clause 8. The UE of clause 7, wherein the request for the reference signal configuration indicates one or more configuration parameters of the first reference signals.

Clause 9. The UE of clause 1, wherein the processor is configured to:
determine whether to transmit, via the transceiver to the network entity, a third reference signal using the main radio or a fourth reference signal via the low-power radio; and
transmit, via the transceiver to the network entity before transmitting the third reference signal or the fourth reference signal, an indication of which of the third reference signal or the fourth reference signal the UE will transmit to the network entity.

Clause 10. A low-power reference signal method comprising:
- transmitting, from a user equipment (UE) to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
- receiving, at the UE from the network entity, a reference signal configuration of the first reference signals; and
- processing, at the UE using the low-power radio, the first reference signals in accordance with the reference signal configuration.

Clause 11. The low-power reference signal method of clause 10, wherein the capability message indicates one or more configuration parameters of the first reference signals that the UE is configured to process using the low-power radio.

Clause 12. The low-power reference signal method of clause 11, wherein the one or more configuration parameters includes an indication of a time-domain-based modulation scheme.

Clause 13. The low-power reference signal method of clause 12, wherein the time-domain-based modulation scheme is on-off keying (OOK) modulation.

Clause 14. The low-power reference signal method of clause 10, further comprising determining, at the UE, whether to have the main radio or the low-power radio process the first reference signals.

Clause 15. The low-power reference signal method of clause 14, wherein determining whether to have the main radio or the low-power radio process the first reference signals is based on a low-power processing signal received at the UE from the network entity.

Clause 16. The low-power reference signal method of clause 10, further comprising transmitting, from the UE to the network entity, a request for the reference signal configuration.

Clause 17. The low-power reference signal method of clause 16, wherein the request for the reference signal configuration indicates one or more configuration parameters of the first reference signals.

Clause 18. The low-power reference signal method of clause 10, further comprising:
- determining at the UE whether to transmit, from the UE to the network entity, a third reference signal using the main radio or a fourth reference signal via the low-power radio; and
- transmitting, from the UE to the network entity before transmitting the third reference signal or the fourth reference signal, an indication of which of the third reference signal or the fourth reference signal the UE will transmit to the network entity.

Clause 19. A user equipment (UE) comprising:
- means for transmitting, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
- means for receiving, from the network entity, a reference signal configuration of the first reference signals; and
- means for processing, using the low-power radio, the first reference signals in accordance with the reference signal configuration.

Clause 20. The UE of clause 19, wherein the capability message indicates one or more configuration parameters of the first reference signals that the UE is configured to process using the low-power radio.

Clause 21. The UE of clause 20, wherein the one or more configuration parameters includes an indication of a time-domain-based modulation scheme.

Clause 22. The UE of clause 21, wherein the time-domain-based modulation scheme is on-off keying (OOK) modulation.

Clause 23. The UE of clause 19, further comprising means for determining whether to have the main radio or the low-power radio process the first reference signals.

Clause 24. The UE of claim 23, wherein the means for determining whether to have the main radio or the low-power radio process the first reference signals comprise means for determining whether to have the main radio or the low-power radio process the first reference signals based on a low-power processing signal received at the UE from the network entity.

Clause 25. The UE of clause 19, further comprising means for transmitting, to the network entity, a request for the reference signal configuration.

Clause 26. The UE of clause 25, wherein the request for the reference signal configuration indicates one or more configuration parameters of the first reference signals.

Clause 27. The UE of clause 19, further comprising:
- means for determining whether to transmit, from the UE to the network entity, a third reference signal using the main radio or a fourth reference signal via the low-power radio; and
- means for transmitting, to the network entity before transmitting the third reference signal or the fourth reference signal, an indication of which of the third reference signal or the fourth reference signal the UE will transmit to the network entity.

Clause 28. A non-transitory, processor-readable storage medium comprising processor-readable instructions to cause a processor of a user equipment (UE) to:
- transmit, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
- receive, from the network entity, a reference signal configuration of the first reference signals; and
- process, using the low-power radio, the first reference signals in accordance with the reference signal configuration.

Clause 29. The non-transitory, processor-readable storage medium of clause 28, wherein the capability message indicates one or more configuration parameters of the first reference signals that the UE is configured to process using the low-power radio.

Clause 30. The non-transitory, processor-readable storage medium of clause 29, wherein the one or more configuration parameters includes an indication of a time-domain-based modulation scheme.

Clause 31. The non-transitory, processor-readable storage medium of clause 30, wherein the time-domain-based modulation scheme is on-off keying (OOK) modulation.

Clause 32. The non-transitory, processor-readable storage medium of clause 28, further comprising processor-readable instructions to cause the processor to determine whether to have the main radio or the low-power radio process the first reference signals.

Clause 33. The non-transitory, processor-readable storage medium of clause 32, wherein the processor-readable instructions to cause the processor to determine whether to have the main radio or the low-power radio process the first reference signals comprise processor-readable instructions to cause the processor to determine whether to have the main radio or the low-power radio process the first reference signals based on a low-power processing signal received at the UE from the network entity.

Clause 34. The non-transitory, processor-readable storage medium of clause 28, further comprising processor-readable instructions to cause the processor to transmit, to the network entity, a request for the reference signal configuration.

Clause 35. The non-transitory, processor-readable storage medium of clause 34, wherein the request for the reference signal configuration indicates one or more configuration parameters of the first reference signals.

Clause 36. The non-transitory, processor-readable storage medium of clause 28, further comprising processor-readable instructions to cause the processor to:
determine whether to transmit, from the UE to the network entity, a third reference signal using the main radio or a fourth reference signal via the low-power radio; and
transmit, to the network entity before transmitting the third reference signal or the fourth reference signal, an indication of which of the third reference signal or the fourth reference signal the UE will transmit to the network entity.

Clause 37. A network entity comprising:
a memory;
a transceiver; and
a processor, communicatively coupled to the memory and the transceiver, configured to:
receive, via the transceiver from a user equipment (UE), a capability message indicating a capability of the UE to process low-power reference signals using a low-power radio of the UE; and
transmit, via the transceiver to the UE, one or more configuration parameters of a low-power reference signal based on the capability message.

Clause 38. The network entity of clause 37, wherein the processor is configured to transmit multiple configuration messages, each containing one or more respective configuration parameters corresponding to a respective low-power reference signal, during a single positioning/sensing session.

Clause 39. The network entity of clause 37, wherein the processor is configured to transmit the one or more configuration parameters in response to receiving, via the transceiver from the UE, a request for a low-power-reference-signal configuration.

Clause 40. A low-power reference signal method comprising:
receiving, at a network entity from a user equipment (UE), a capability message indicating a capability of the UE to process low-power reference signals using a low-power radio of the UE; and
transmitting, from the network entity to the UE, one or more configuration parameters of a low-power reference signal based on the capability message.

Clause 41. The low-power reference signal method of clause 40, wherein transmitting the one or more configuration parameters comprises transmitting multiple configuration messages, each containing one or more respective configuration parameters corresponding to a respective low-power reference signal, during a single positioning/sensing session.

Clause 42. The low-power reference signal method of clause 40, wherein the one or more configuration parameters are transmitted in response to receiving, at the network entity from the UE, a request for a low-power-reference-signal configuration.

Clause 43. A network entity comprising:
means for receiving, from a user equipment (UE), a capability message indicating a capability of the UE to process low-power reference signals using a low-power radio of the UE; and
means for transmitting, to the UE, one or more configuration parameters of a low-power reference signal based on the capability message.

Clause 44. The network entity of clause 43, wherein the means for transmitting the one or more configuration parameters comprise means for transmitting multiple configuration messages, each containing one or more respective configuration parameters corresponding to a respective low-power reference signal, during a single positioning/sensing session.

Clause 45. The network entity of clause 43, wherein the means for transmitting the one or more configuration parameters comprise means for transmitting the one or more configuration parameters in response to receiving, from the UE, a request for a low-power-reference-signal configuration.

Clause 46. A non-transitory, processor-readable storage medium comprising processor-readable instructions to cause a processor of a network entity to:
receive, from a user equipment (UE), a capability message indicating a capability of the UE to process low-power reference signals using a low-power radio of the UE; and
transmit, to the UE, one or more configuration parameters of a low-power reference signal based on the capability message.

Clause 47. The non-transitory, processor-readable storage medium of clause 46, wherein the processor-readable instructions to cause the processor to transmit the one or more configuration parameters comprise processor-readable instructions to cause the processor to transmit multiple configuration messages, each containing one or more respective configuration parameters corresponding to a respective low-power reference signal, during a single positioning/sensing session.

Clause 48. The non-transitory, processor-readable storage medium of clause 46, wherein the processor-readable instructions to cause the processor to transmit the one or more configuration parameters comprise processor-readable instructions to cause the processor to transmit the one or more configuration parameters in response to receiving, from the UE, a request for a low-power-reference-signal configuration.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a memory;
a transceiver comprising a main radio and a low-power radio, wherein the low-power radio is configured to process first reference signals using less power than the main radio is configured to use to process second reference signals, the first reference signals being low-power reference signals; and
a processor, communicatively coupled to the memory and the transceiver, configured to:
transmit, via the transceiver to a network entity, a capability message indicating a capability of the UE to process the first reference signals using the low-power radio;
receive, via the transceiver from the network entity, a reference signal configuration of the first reference signals; and
process, using the low-power radio, the first reference signals in accordance with the reference signal configuration;
wherein the processor is configured to determine, based on a low-power processing signal received via the transceiver, whether to have the main radio or the low-power radio process the first reference signals.

2. The UE of claim 1, wherein the capability message indicates one or more configuration parameters of the first reference signals that the UE is configured to process using the low-power radio.

3. The UE of claim 2, wherein the one or more configuration parameters includes an indication of a time-domain-based modulation scheme.

4. The UE of claim 3, wherein the time-domain-based modulation scheme is on-off keying (OOK) modulation.

5. The UE of claim 1, wherein the processor is configured to transmit, via the transceiver to the network entity, a request for the reference signal configuration.

6. The UE of claim 5, wherein the request for the reference signal configuration indicates one or more configuration parameters of the first reference signals.

7. A user equipment (UE) comprising:
a memory;
a transceiver comprising a main radio and a low-power radio, wherein the low-power radio is configured to process first reference signals using less power than the main radio is configured to use to process second reference signals, the first reference signals being low-power reference signals; and
a processor, communicatively coupled to the memory and the transceiver, configured to:
transmit, via the transceiver to a network entity, a capability message indicating a capability of the UE to process the first reference signals using the low-power radio;
receive, via the transceiver from the network entity, a reference signal configuration of the first reference signals;
process, using the low-power radio, the first reference signals in accordance with the reference signal configuration;
determine whether to transmit, via the transceiver to the network entity, a third reference signal using the main radio or a fourth reference signal via the low-power radio; and
transmit, via the transceiver to the network entity before transmitting the third reference signal or the fourth reference signal, an indication of which of the third reference signal or the fourth reference signal the UE will transmit to the network entity.

8. A low-power reference signal method comprising:
transmitting, from a user equipment (UE) to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
receiving, at the UE from the network entity, a reference signal configuration of the first reference signals;
determining, based on a low-power processing signal received at the UE from the network entity, whether to have the main radio or the low-power radio process the first reference signals; and
processing, at the UE using the low-power radio, the first reference signals in accordance with the reference signal configuration.

9. The low-power reference signal method of claim 8, wherein the capability message indicates one or more configuration parameters of the first reference signals that the UE is configured to process using the low-power radio.

10. The low-power reference signal method of claim 9, wherein the one or more configuration parameters includes an indication of a time-domain-based modulation scheme.

11. The low-power reference signal method of claim 10, wherein the time-domain-based modulation scheme is on-off keying (OOK) modulation.

12. The low-power reference signal method of claim 8, further comprising transmitting, from the UE to the network entity, a request for the reference signal configuration.

13. The low-power reference signal method of claim 12, wherein the request for the reference signal configuration indicates one or more configuration parameters of the first reference signals.

14. A low-power reference signal method comprising:
transmitting, from a user equipment (UE) to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
receiving, at the UE from the network entity, a reference signal configuration of the first reference signals;
processing, at the UE using the low-power radio, the first reference signals in accordance with the reference signal configuration;
determining at the UE whether to transmit, from the UE to the network entity, a third reference signal using the main radio or a fourth reference signal via the low-power radio; and
transmitting, from the UE to the network entity before transmitting the third reference signal or the fourth reference signal, an indication of which of the third reference signal or the fourth reference signal the UE will transmit to the network entity.

15. A user equipment (UE) comprising:
means for transmitting, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
means for receiving, from the network entity, a reference signal configuration of the first reference signals;
means for determining, based on a low-power processing signal received at the UE from the network entity, whether to have the main radio or the low-power radio process the first reference signals; and
means for processing, using the low-power radio, the first reference signals in accordance with the reference signal configuration.

16. The UE of claim 15, wherein the capability message indicates one or more configuration parameters of the first reference signals that the UE is configured to process using the low-power radio.

17. The UE of claim 16, wherein the one or more configuration parameters includes an indication of a time-domain-based modulation scheme.

18. The UE of claim 17, wherein the time-domain-based modulation scheme is on-off keying (OOK) modulation.

19. The UE of claim 15, further comprising means for transmitting, to the network entity, a request for the reference signal configuration.

20. The UE of claim 19, wherein the request for the reference signal configuration indicates one or more configuration parameters of the first reference signals.

21. A user equipment (UE) comprising:
means for transmitting, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
means for receiving, from the network entity, a reference signal configuration of the first reference signals;
means for processing, using the low-power radio, the first reference signals in accordance with the reference signal configuration;
means for determining whether to transmit, from the UE to the network entity, a third reference signal using the main radio or a fourth reference signal via the low-power radio; and
means for transmitting, to the network entity before transmitting the third reference signal or the fourth reference signal, an indication of which of the third reference signal or the fourth reference signal the UE will transmit to the network entity.

22. A non-transitory, processor-readable storage medium comprising processor-readable instructions to cause a processor of a user equipment (UE) to:
transmit, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
receive, from the network entity, a reference signal configuration of the first reference signals;
determine, based on a low-power processing signal received at the UE from the network entity, whether to have the main radio or the low-power radio process the first reference signals; and
process, using the low-power radio, the first reference signals in accordance with the reference signal configuration.

23. The non-transitory, processor-readable storage medium of claim 22, wherein the capability message indicates one or more configuration parameters of the first reference signals that the UE is configured to process using the low-power radio.

24. The non-transitory, processor-readable storage medium of claim 23, wherein the one or more configuration parameters includes an indication of a time-domain-based modulation scheme.

25. A non-transitory, processor-readable storage medium comprising processor-readable instructions to cause a processor of a user equipment (UE) to:
transmit, to a network entity, a capability message indicating a capability of the UE to process low-power reference signals using a low-power radio of the UE, wherein the low-power radio is configured to process first reference signals using less power than a main radio of the UE is configured to use to process second reference signals, the first reference signals being low-power reference signals;
receive, from the network entity, a reference signal configuration of the first reference signals;
process, using the low-power radio, the first reference signals in accordance with the reference signal configuration;
determine whether to transmit, from the UE to the network entity, a third reference signal using the main radio or a fourth reference signal via the low-power radio; and
transmit, to the network entity before transmitting the third reference signal or the fourth reference signal, an indication of which of the third reference signal or the fourth reference signal the UE will transmit to the network entity.

* * * * *